(12) United States Patent
Kuhn et al.

(10) Patent No.: US 8,719,188 B2
(45) Date of Patent: May 6, 2014

(54) DETERMINING A DYNAMIC USER PROFILE INDICATIVE OF A USER BEHAVIOR CONTEXT WITH A MOBILE DEVICE

(75) Inventors: Lukas Daniel Kuhn, San Diego, CA (US); Sanjiv Nanda, Ramona, CA (US); Vidya Narayanan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 227 days.

(21) Appl. No.: 13/268,027

(22) Filed: Oct. 7, 2011

(65) Prior Publication Data
US 2012/0185419 A1 Jul. 19, 2012

Related U.S. Application Data

(60) Provisional application No. 61/432,538, filed on Jan. 13, 2011.

(51) Int. Cl.
*G06F 15/18* (2006.01)
*G06G 7/00* (2006.01)

(52) U.S. Cl.
USPC .......................................................... 706/5

(58) Field of Classification Search
None
See application file for complete search history.

(56) References Cited

U.S. PATENT DOCUMENTS

| | | | |
|---|---|---|---|
| 6,912,398 B1 | 6/2005 | Domnitz | |
| 7,848,765 B2 | 12/2010 | Phillips et al. | |
| 8,274,945 B2 * | 9/2012 | Jayaram et al. | 370/331 |
| 8,274,956 B2 * | 9/2012 | Meylan et al. | 370/338 |
| 8,279,782 B2 * | 10/2012 | Abdel-Ghaffar et al. | 370/278 |
| 8,311,543 B2 * | 11/2012 | Dravida et al. | 455/437 |

(Continued)

FOREIGN PATENT DOCUMENTS

| | | |
|---|---|---|
| CN | 1783892 A | 6/2006 |
| CN | 1832494 A | 9/2006 |

(Continued)

OTHER PUBLICATIONS

Kim et al., "Context-aware Recommender Systems using Data Mining Techniques", World Academy of Science, Engineering and Technology 64, 2010, pp. 357-362.

(Continued)

*Primary Examiner* — Michael B Holmes
(74) *Attorney, Agent, or Firm* — Kilpatrick Townsend & Stockton LLP

(57) ABSTRACT

Methods, apparatuses and articles of manufacture for use in a mobile device to determine whether a dynamic user profile is to transition from a first state to a second state based, at least in part, on one or more sensed indicators. The dynamic user profile may be indicative of one or more current inferable user behavior contexts for a user co-located with the mobile device. The mobile device may transition a dynamic user profile from a first state to a second state, in response to a determination that the dynamic user profile is to transition from the first state to the second state, and operatively affect one or more functions performed, at least in part, by the mobile device based, at least in part, on the transition of the dynamic user profile to the second state.

54 Claims, 3 Drawing Sheets

(56) References Cited

U.S. PATENT DOCUMENTS

| | | | |
|---|---|---|---|
| 8,364,148 B2 * | 1/2013 | Dravida et al. | 455/435.2 |
| 8,406,237 B2 * | 3/2013 | Ulupinar et al. | 370/395.52 |
| 8,433,374 B2 * | 4/2013 | Deshpande et al. | 455/574 |
| 8,452,332 B2 * | 5/2013 | Yavuz et al. | 455/561 |
| 8,477,731 B2 * | 7/2013 | Nanda et al. | 370/332 |
| 8,483,704 B2 * | 7/2013 | Nanda et al. | 455/456.1 |
| 8,488,508 B2 * | 7/2013 | Nanda et al. | 370/312 |
| 8,489,135 B2 * | 7/2013 | Nanda et al. | 455/519 |
| 8,553,526 B2 * | 10/2013 | Meylan et al. | 370/216 |
| 2002/0111154 A1 | 8/2002 | Eldering et al. | |
| 2009/0170552 A1 | 7/2009 | Lin | |
| 2010/0223135 A1 | 9/2010 | Griffin et al. | |
| 2010/0262449 A1 | 10/2010 | Monteforte et al. | |
| 2010/0331016 A1 | 12/2010 | Dutton et al. | |
| 2010/0332324 A1 | 12/2010 | Khosravy et al. | |
| 2011/0087685 A1 | 4/2011 | Lin et al. | |

FOREIGN PATENT DOCUMENTS

| | | | | |
|---|---|---|---|---|
| CN | 101185315 A | 5/2008 | | |
| TW | 200930026 A | 7/2009 | | |
| WO | WO 2006/125992 A1 * | 5/2006 | | H04Q 7/38 |
| WO | WO2006125992 A1 | 11/2006 | | |

OTHER PUBLICATIONS

Peebles, et al., "Community-Guided Learning: Exploiting Mobile Sensor Users to Model Human Behavior," Proceedings of the 24th AAAI Conference on Artificial Intelligence, Jul. 11-15, 2010, 7 pages.

International Search Report and Written Opinion—PCT/US2012/021063—ISA/EPO—Mar. 27, 2012 (110823WO).

* cited by examiner

DETERMINING A DYNAMIC USER PROFILE INDICATIVE OF A USER BEHAVIOR CONTEXT WITH A MOBILE DEVICE

This patent application claims benefit of and priority to U.S. Provisional Patent Application 61/432,538, filed Jan. 13, 2011, entitled "Improving Semantic Place Identification", and which is hereby incorporated by reference.

BACKGROUND

1. Field

The subject matter disclosed herein relates to electronic devices, and more particularly to methods, apparatuses and articles of manufacture for use in a mobile device to determine a dynamic user profile that may be indicative of a current inferable user behavior context.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile devices. Location based services in a wireless network typically rely on GPS and/or indoor positioning technologies for obtaining estimates of locations of mobile devices. Such mobile devices, for example, may include circuitry and/or logic capable of processing signals received from transmitters to measure ranges to such transmitters. With such range measurements and knowledge of the locations of the transmitters, a location of such a mobile device may be estimated using well known techniques.

In particular implementations, a mobile device may be capable of communicating (e.g., wirelessly) with a centralized location server operating as part of a navigation system to provide location based services. Such a location server may communicate with a mobile device to receive, for example, estimates of location of the mobile device and/or information indicative of ranges to transmitters at known location. A location server may use such information to track the location of a mobile device over time.

In some particular applications, a navigation system may apply geofencing whereby an action may be taken if a mobile device enters a perimeter about a particular point of interest (POI). Here, a boundary or perimeter about such a POI may be defined at a particular distance to provide a circle enclosing the POI. Of course, shapes other than a circle may be used for geofencing. In one particular implementation, a promotional message and/or coupon from an establishment may be transmitted to a mobile station by a venue operator if the mobile station's location moves to within a geofence enclosing the establishment. Here, it is assumed that if a person traveling with the mobile station moves to within such a geofence boundary, there is a substantial likelihood that the person will imminently pass by or approach the particular point of interest.

Typical geofencing applications may be premised on the notion that if a mobile device user is proximate to a point of interest, there is a substantial likelihood that the user is interested in the point of interest, and may likely take a particular action with respect to the POI. A simple geofencing operation associating individuals to a POI merely by being within a geofence boundary, however, may not fully appreciate a relationship of an individual with a proximate or geographically close POI.

SUMMARY

In accordance with an example aspect, a method may comprise, at a mobile device: determining whether a dynamic user profile is to transition from a first state to a second state based, at least in part, on one or more sensed indicators, the dynamic user profile being indicative of a current inferable user behavior context for a user co-located with the mobile device; transitioning the dynamic user profile from the first state to the second state in response to a determination that the dynamic user profile is to transition from a first state to a second state; and operatively affecting one or more functions performed, at least in part, by the mobile device based, at least in part, on the transition of the dynamic user profile from the first state to the second state.

In accordance with another example aspect, an apparatus for use in a mobile device may comprise: means for determining whether a dynamic user profile is to transition from a first state to a second state based, at least in part, on one or more sensed indicators, the dynamic user profile being indicative of a current inferable user behavior context for a user co-located with the mobile device; means for transitioning the dynamic user profile from the first state to the second state, in response to a determination that the dynamic user profile is to transition from a first state to a second state; and means for operatively affecting one or more functions performed, at least in part, by the mobile device based, at least in part, on the transition of the dynamic user profile from the first state to the second state.

In accordance with yet another example aspect, a mobile device may comprise: memory; and a processing unit to: determine whether a dynamic user profile is to transition from a first state to a second state based, at least in part, on one or more sensed indicators in the memory, the dynamic user profile being indicative of a current inferable user behavior context for a user co-located with the mobile device; transition the dynamic user profile from the first state to the second state, in response to a determination that the dynamic user profile is to transition from a first state to a second state; and operatively affect one or more functions performed, at least in part, by the mobile device based, at least in part, on the transition of the dynamic user profile from the first state to the second state.

In accordance with still another example aspect, an article of manufacture may comprise: a non-transitory computer-readable medium having stored therein computer-readable instructions executable by one or more processing units in a mobile device to: determine whether a dynamic user profile is to transition from a first state to a second state based, at least in part, on one or more sensed indicators, the dynamic user profile being indicative of a current inferable user behavior context for a user co-located with the mobile device; transition the dynamic user profile from the first state to the second state, in response to a determination that the dynamic user profile is to transition from a first state to a second state; and operatively affect one or more functions performed, at least in part, by the mobile device based, at least in part, on the transition of the dynamic user profile from the first state to the second state.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
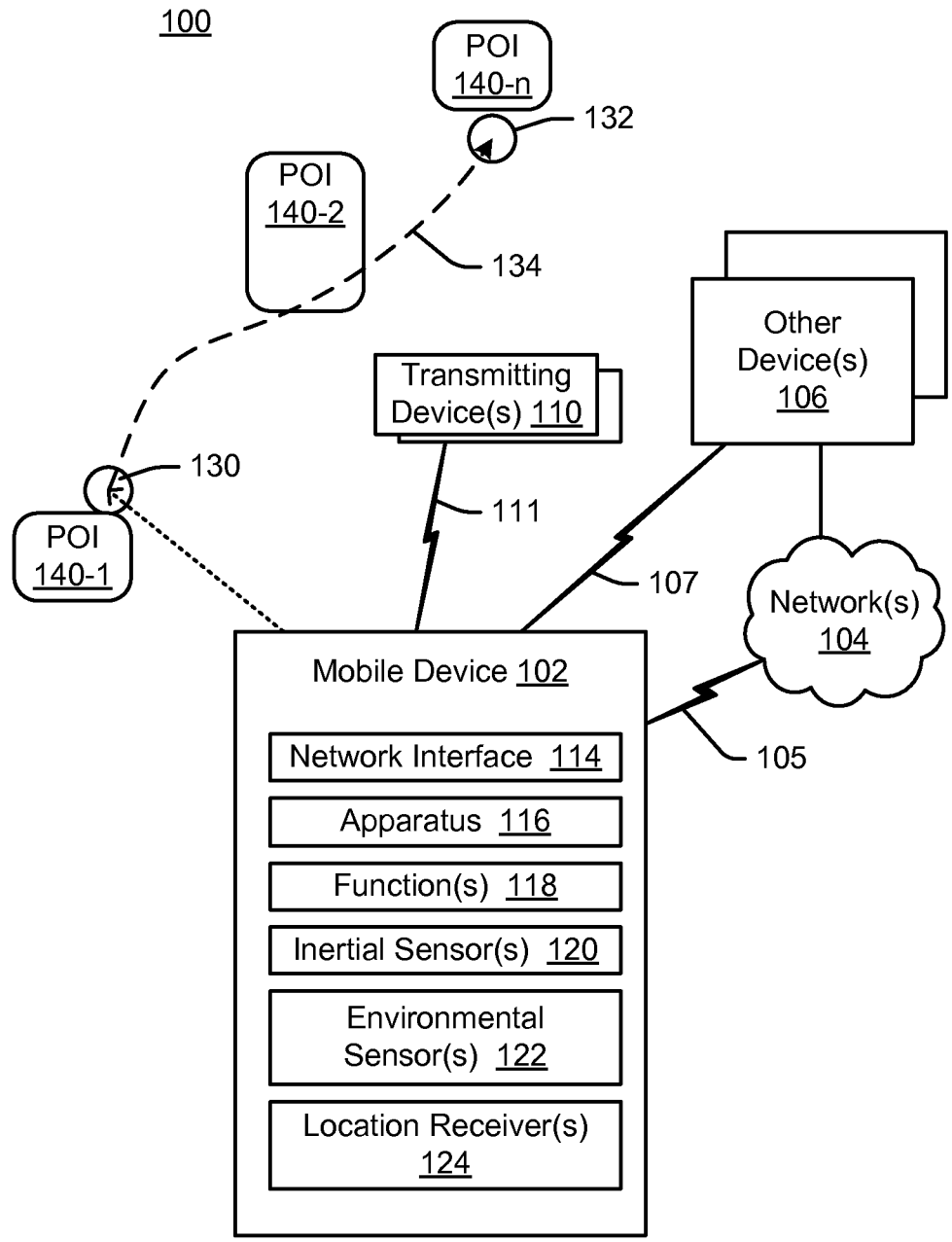
FIG. 1 is a schematic block diagram illustrating an example environment comprising a mobile device that may determine a dynamic user profile that may be indicative of a current inferable user behavior context for a user, in accordance with an implementation.

A person's behavior tends to vary from time to time depending on a variety of factors. For example, a person's behavior may vary from time to time with regard to one or more points of interest (e.g., locations, venues, places, entities, businesses, structures, objects, etc.), one or more activities (e.g., working, vacationing, exercising, commuting, caring for children, attending to certain errands, shopping, driving, walking, etc.), one or more time periods (e.g., time of day, day of week, date, working hours, non-working hours, etc.), and/or the like or some combination thereof.

Since one or more functions performed, at least in part, by a mobile device may be of possible use or assistance to a person (user), it may be beneficial for a mobile device to identify a current user behavior context and to possibly affect one or more functions that may or may not be of current use to the user. Depending on a current user behavior context, for example, it may be useful to affect an operation of various location based service functions, position location functions, navigation functions, network communication functions, user output functions, and/or the like or some combinations thereof.

With this in mind, various techniques are described herein which may be implemented in a mobile device to inferentially identify a current user behavior context with regard to a user of a mobile device based, at least in part, on one or more sensed indicators obtained by the mobile device. For example, certain sensed indicators may be based, at least in part, on one or more wireless signals received from one or more other devices, one or more sensed inertial movements of the mobile device, one or more sensed environmental measurements, one or more encoded audio signals, one or more encoded images, and/or the like or some combination thereof. In certain examples, one or more sensed indicators may be based, at least in part, on an estimated position location of the mobile device, an estimated future destination of the mobile device, an estimated route of travel of the mobile device, and/or the like or some combination thereof. In still other examples, one or more sensed indicators may be based, at least in part, on various data files, such as one or more user schedule files, one or more user communication files, one or more user preference files, and/or the like or some combination thereof.

Thus, in certain example implementations, a mobile device may determine a dynamic user profile that may be indicative of a current inferable user behavior context for a user co-located with the mobile device, and operatively affect one or more functions based, at least in part, on the dynamic user profile. More specifically, in certain example implementations a mobile device may determine whether a dynamic user profile is to transition from a first state to a second state based, at least in part, on one or more sensed indicators. Such a mobile device may, for example, transition the dynamic user profile from the first state to the second state in response to a determination that the dynamic user profile is to transition from a first state to a second state, and operatively affect one or more functions performed, at least in part, by the mobile device based, at least in part, on the transition of the dynamic user profile from the first state to the second state.

Thus, in certain example implementations, a mobile device may establish and/or maintain one or more patterns or models of behavior associated with various states. Hence, for example, a mobile device may determine whether a dynamic user profile is to transition from a first state to a second state based, at least in part, on whether one or more sensed indicators sufficiently "matches" a particular stored pattern or model of behavior previously associated with a first state, a second state, and/or some other state of the dynamic user profile.

By way of example, a dynamic user profile may be associated with a point of interest (POI) such as a business office, a store, a restaurant, etc., that a user and co-located mobile device may be at or nearby. A user may have differing roles (e.g., purposes, intentions, etc.) with regard to such POI and hence exhibit different behaviors and/or perform different activities from time to time with regard to such POI. For example, a user may visit a particular POI from time to time as a visitor, a client, a customer, etc. As such, for example, a dynamic user profile may indicate such user behavior as a first state. One or more sensed indicators may, for example, be considered to determine that the dynamic user profile is in or will be transitioning to such a first state. Hence, with the dynamic user profile being in a first state a function such as a location based service function may operate to provide a user with additional information (e.g., an advertisement, a discount coupon, etc.) that may be of interest to the user regarding the POI, and/or some other possibly competing or otherwise related POI. However, the same user may also visit the same POI at other times as a worker (e.g., a volunteer, an employee, etc.). As such, for example, a dynamic user profile may indicate such user behavior as a second state. One or more sensed indicators may, for example, be considered to determine that the dynamic user profile is in or will be transitioning to a second state. Hence, in response to a transition of the dynamic user profile to such a second state, a function such as the above-mentioned location based service function may be operatively affected in some manner. For example, a user may not be interested in receiving certain additional information regarding a particular POI, and/or some other possibly competing or otherwise related POI, while at work at the particular POI, or even while commuting to or from work at the particular POI.

By way of example, a dynamic user profile may have different states depending, at least in part, on differences relating to one or more user activities. For example, a user activity of driving an automobile may be associated with different states. For example, a dynamic user profile may indicate that a user may be commuting to or from work as a first state, to or from a child's school as a second state, to a hospital (e.g., for an emergency, appointment, etc.) as a third state, to a particular destination (e.g., second home, vacation spot, etc.) as a fourth state, etc. In certain instances, for example, one or more states of a dynamic user profile may indicate that a user may be driving or riding in a particular automobile and/or other type of vehicle or transportation mechanism (e.g., bus, train, boat, airplane, etc.). In certain instances, for example, one or more states of a dynamic user profile may indicate that a user may or may not be accompanied by certain other people, e.g., with or without one or more children, etc. For example, it may be determined that a user is with a particular person based on a signals received from a mobile device carried by the other person, by a schedule or calendar entry, by sounds recorded using a microphone, etc. One or more sensed indicators may, for example, be considered to determine that the dynamic user profile is in or will be transitioning to a particular state. Hence, in response to a transition of the dynamic user profile to a particular state, one or more functions may be operatively affected in some manner. For example, a user may or may not be interested in receiving certain additional information from a location based service function and/or other function(s) while attending to certain errands, such as, driving a child to school in the morning and/or driving to the school to pick up the child from school later that same day. For example, a user may or may not be interested in receiving certain additional information from a location based service function and/or other function(s) while attempting to drive directly to an emergency room of a hospital, an airport, an upcoming appointment or meeting, etc. For example, while a user may be interested in receiving certain additional information from a location based service function and/or other function(s) while driving in a particular vehicle, they may not be as interested in such additional information while riding as a passenger on a train or bus. Similarly, for example, while a user may be interested in receiving certain additional information from a location based service function and/or other function(s) while walking or strolling at or nearby a particular POI, the user may not be as interested in such additional information while exercising (e.g., running, bicycling, etc.) at or nearby such particular POI. Likewise, for example, while a user may be interested in receiving certain additional information from a location based service function and/or other function(s) while alone or with other adults, the user may not be as interested in such additional information while caring for a child, other people, or animals. For example, a user may not be interested in receiving information relating to a cigar shop while caring for a child or walking a dog.

As alluded to in the various examples above, a dynamic user profile may have different states depending, at least in part, on different periods of time. For example, a user may have differing roles (e.g., purposes, intentions, etc.) with regard to a POI and/or an activity based on a time of day, a day of week, a date, etc., and hence exhibit different behaviors at different times. For example, a dynamic user profile may have different states depending on periods of time associated with a scheduled, planned, or otherwise identifiable or reoccurring event, such as, e.g., a workday, a lunch break, a meal time, a weekend, a vacation day, a holiday, a birthday, an exercise class, an appointment, a commute time, a religious service, an arrival or departure time, a theater or game time, hours of operation of a POI, a particular starting or ending time relating to an event or object, and/or the like or some combination thereof. For example, while a user may have abundant time to shop for groceries on a weekend, the same user may have relatively less time to purchase a few selected items at the grocery store on a weekday while commuting home from work. As another example, a user traveling to an exercise class may not be as interested in receiving information relating to a donut shop, a tavern, or cigar shop. Additionally, for example, a user who appears to have recently obtained a morning coffee from a first coffee shop or at home (e.g., from an appliance) prior to or while commuting to work, may not be as interested in receiving a time-limited coupon for a coffee from another vendor during the remainder of their commute.

With the preceding examples in mind, example data processing techniques are provided below which may be implemented as various methods, apparatuses, or otherwise provided in articles of manufacture for use by a mobile device that may comprise or take the form of a special purpose computing platform to determine whether a dynamic user profile is to transition from one state to another state based, at least in part, on one or more sensed indicators, and wherein the dynamic user profile may be indicative of a current inferable user behavior context for a user co-located with the mobile device.

FIG. 1 is a schematic block diagram illustrating an example environment 100 comprising an example mobile device 102 comprising an apparatus 116 that may be used to determine whether a dynamic user profile is to transition from one state to another state, transition the dynamic user profile accordingly, and operatively affect one or more functions 118 performed, at least in part, by mobile device 102, in accordance with an implementation. As illustrated, environment 100 may also comprise one or more networks 104, one or more other devices 106, and one or more transmitting devices 110, all or some of which may be operatively coupled together via one or more wireless and/or wired communication links. In certain example instances, transmitting devices 110 may transmit one or more wireless signals 111 that may be received by a network interface 114 and/or one or more location receivers 124 of mobile device 102. In certain example instances, other devices 106 may transmit one or more wireless signals 107 that may be received by network interface 114 of mobile device 102, and/or receive one or more wireless signals 107 that may be transmitted by network interface 114. In certain example instances, other devices 106 may transmit one or more signals over a wired communication link with network(s) 104, and/or receive one or more signals over a wired communication link with network(s) 104. In certain example instances, network(s) 104 may transmit one or more wireless signals 105 that may be received by network interface 114 of mobile device 102, and/or receive one or more wireless signals 107 that may be transmitted by network interface 114.

By way of example, mobile device 102 may comprise any electronic device that may be moved about by a user and which comprises a network interface 114 for receiving signals transmitted by transmitting devices 110 (e.g., access points, cell towers, beacons, satellites, etc.) and/or other resources in network(s) 104, etc. Thus, by way of some examples, mobile device 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile device 102 and used, at least in part, to determine whether a dynamic user profile is to transition from one state to another state, transition the dynamic user profile accordingly, and operatively affect one or more functions 118 performed, at least in part, by mobile device 102. Functions 118 may, for example, be representative of one or more location based service functions, one or more position location functions, one or more navigation functions, one or more network communication functions, one or more user output functions, and/or the like or some combination thereof.

In certain example implementations, mobile device 102 may function exclusively or selectively as a stand-alone device, and may provide a one or more capabilities/services of interest/use to a user. In certain example implementations, mobile device 102 may communicate in some manner with one or more other devices 106 directly, or indirectly, e.g., as illustrated by the wireless/wired communication links using the network(s) 104. Network(s) 104 may be representative of one or more communication and/or computing resources (e.g., devices and/or services) which mobile device 102 may communicate with or through, e.g., via network interface 114 using one or more wired or wireless communication links. Thus, in certain instances mobile device 102 may receive (or send) data and/or instructions via network(s) 104. In certain instances, mobile device 102 may, for example, not only receive a signal from a transmitting device 110, but may also transmit a signal to such a transmitting device (e.g., having a receiver).

In certain example implementations, mobile device 102 may be enabled to receive signals associated with one or more wireless communication networks, location services, and/or the like or any combination thereof which may be associated with one or more transmitting devices 110 and/or network(s) 104.

Mobile device 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile device 102 may be enabled, e.g., via network interface 114 or a location receiver 124, for use with various location service(s), such as, a Global Navigation Satellite System (GNSS), or other like satellite and/or terrestrial locating service, a location based service (e.g., via a cellular network, a WiFi network, etc.), and/or the like or some combination thereof.

One or more other devices 106 is illustrated as being connected to mobile device 102 and/or network(s) 104 via one or more network interfaces (not shown), which in certain implementations may be similar to network interface 114. Other device 106 may, for example, comprise one or more computing platforms, one or more other mobile devices, one or more appliances, one or more machines, and/or the like or some combination thereof.

As described in greater detail below, apparatus 116 may obtain one or more sensed indicators using network interface 114, one or more location receivers 124, one or more inertial sensors 120 (e.g., accelerometers, gyrometers, gyroscopes, etc.), one or more environmental sensors 122 (e.g., magnetometers, compass, barometer, thermometer, stress gauge, microphone or other sound transducer, camera or other light sensitive sensors, etc.), and/or the like or some combination thereof.

Also illustrated in FIG. 1 is an estimated position location 130 of mobile device 102. Estimated position location 130 may, for example, represent a current or recent estimate of a position location of mobile device 102 based on one or more signals received from transmitting devices 110 using network interface 114 and/or location receiver 124. Such location position estimating techniques are well known and may, for example, be used to identify a coordinate-based location (e.g., latitude, longitude, altitude, grid point, etc.) relative to a map or other like drawing, and possibly additional motion related information (e.g., heading, velocity, etc.) relative to the recent movement of mobile device 102. Also, various perceived motion related information (e.g., orientation, heading, velocity, accelerations, decelerations, turns, mode of travel indications, etc.) relative to the recent movements of mobile device 102 may be obtained based, at least in part, on one or more signals and/or measurements of one or more inertial sensors 120, one or more environmental sensors, and/or the like or some combination thereof, again using known techniques. Hence, in certain example implementations, one or more estimated routes of travel 134 to an estimated future destination 132 may be known or determined by mobile device 102. As illustrated, estimated position location 130 may correspond to a first POI 140-1 (e.g., a home of a user), estimated future destination 132 may correspond to a target POI 140-n (e.g., an office building, an airport, a doctor's office, a public venue, an object, etc.), and an estimated route of travel 134 may pass nearby or possibly through one or more other POIs represented by POI 140-2. In certain example implementations, POI 140-2 may represent an intended intermediate target POI (e.g., an automated teller machine, a daycare facility or school drop-off/pick-up, etc.) or may represent an unintended POI for which information may or may not be of interest to a user of mobile device 102 (e.g., a coffee shop, oil change business, etc.). Points of interest and route planning may, for example, be provided in whole or in part by one or more functions performed by mobile device 102 and/or in other computing devices.

Figure 2:
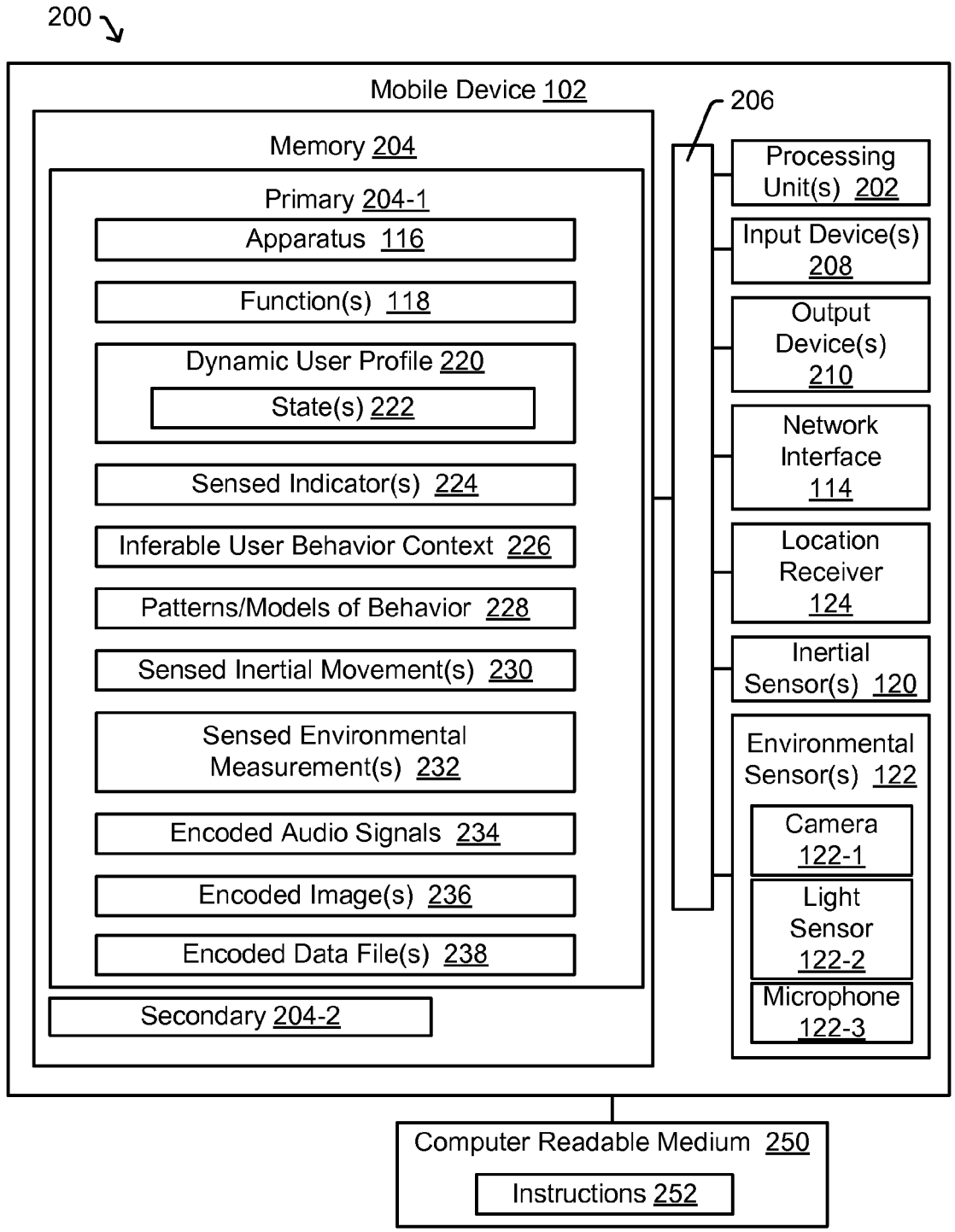
FIG. 2 is a schematic block diagram illustrating certain features of an example computing platform in the form of a mobile device to determine a dynamic user profile that may be indicative of a current inferable user behavior context for a user, in accordance with an implementation.

FIG. 2 is a schematic block diagram illustrating certain features of an example computing platform 200 shown in the form of mobile device 102 for use in determining whether a dynamic user profile is to transition from one state to another state, transitioning the dynamic user profile accordingly, and operatively affecting one or more functions performed, at least in part, by mobile device 102, in accordance with an implementation.

As illustrated mobile device 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer-readable medium 250. Memory 204 and/or computer-readable medium 250 may comprise instructions 252 associated with data processing, e.g., in accordance with the techniques and/or apparatus 116 (FIG. 1), as provided herein. It will be understood that the computer-readable medium 250 can comprise any of a variety of non-transitory computer-readable media, including storage devices or systems similar to those of primary memory 204-1 and/or secondary memory 204-2 described above.

Mobile device 102 may, for example, further comprise one or more user input devices 208, one or more output devices 210, one or more network interfaces 114, one or more location receivers 124, one or more inertial sensors 120, and/or one or more environmental sensors 122. As illustrated, in certain example implementations, an environmental sensor 122 may comprise a camera 122-1 or some other form of a light sensitive sensor 122-2, a microphone 122-3, and/or the like or some combination thereof, which in certain instances may also take the form of an input device.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitting devices 110 and/or network(s) 104 (FIG. 1), e.g., via one or more communication links. Location receiver 124 may, for example, obtain signals from one or more location services, GPS, etc. (not shown), which may be used in estimating a location of mobile device 102 at certain times.

Processing unit(s) 202 and/or instructions 252 may, for example, provide or otherwise be associated with one or more encoded electrical signals stored in memory 204, such as, apparatus 116, one or more functions 118, a dynamic user profile 220 and a state 222 thereof, one or more sensed indicators 224, a current inferable user behavior context 226, one or more patterns or models of behavior 228, one or more sensed inertial movements 230, one or more sensed environmental measurements 232, one or more encoded audio signals 234, one or more encoded images 236, one or more encoded data files 238 (e.g., user schedule files, user communication files, etc.), and/or the like or any combination thereof, e.g., as described in the various example techniques herein.

Figure 3:
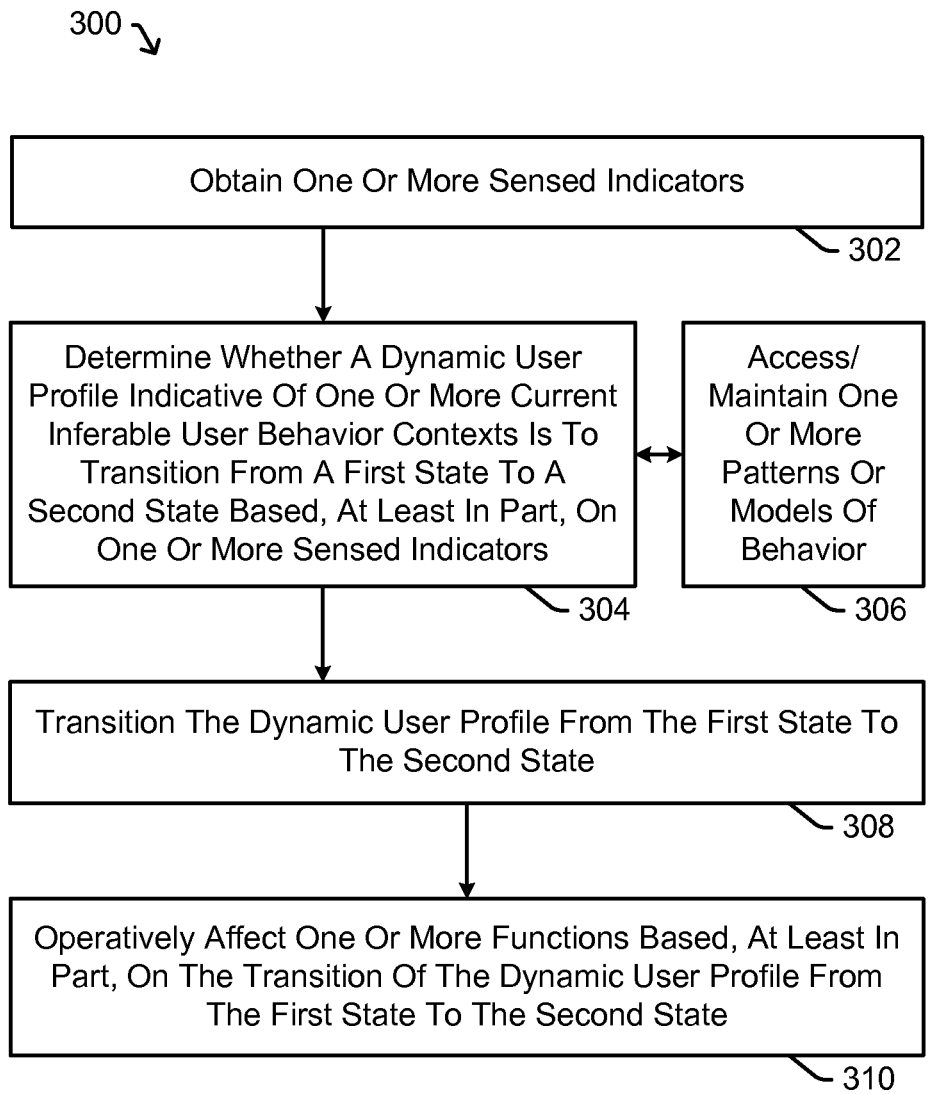
FIG. 3 is a flow diagram illustrating certain features of an example process or method for use in a mobile device to determine a dynamic user profile that may be indicative of a current inferable user behavior context for a user, in accordance with an implementation.

FIG. 3 is a flow diagram illustrating certain features of an example process or method 300 for use at a mobile device 102, in accordance with an implementation.

At example block 302, one or more sensed indicators may be obtained. For example, certain sensed indicators may be based, at least in part, on one or more wireless signals received from one or more other devices 106, one or more sensed inertial movements 230 of the mobile device, one or more sensed environmental measurements 232, one or more encoded audio signals 234, one or more encoded images 236, and/or the like or some combination thereof. In certain examples, one or more sensed indicators may be based, at least in part, on an estimated position location 130 of the mobile device, an estimated future destination 132 of the mobile device, an estimated route of travel 134 of the mobile device, and/or the like or some combination thereof. In still other examples, one or more sensed indicators may be based, at least in part, on various encoded data files 234, such as, one or more user schedule files (e.g., associated with a calendar or other like application, etc.), one or more user communication files (e.g., a call log, email log, etc.), one or more user preference files (e.g., comprising implicitly defined preferences, learned or inferred preferences, historical records, etc.), and/or the like or some combination thereof.

At example block 304, mobile device 102 may determine whether a dynamic user profile 220, which is indicative of a current inferable user behavior context, is to transition from a first state to a second state based, at least in part, on one or more sensed indicators 224. For example, at block 304, a mobile device 102 may determine whether one or more sensed indicators sufficiently "match" one or more stored patterns or models of behavior previously associated with one or more states 222, and/or if a previously unknown state may be learned and established, e.g., based, at least in part, on one or more sensed indicators. In certain example implementations, a determination at block 304 may comprise a determination that mobile device 102 may be estimated to within a threshold distance (direct or indirect via some path) of a location of a POI 140. In certain example implementations, a determination at block 304 may comprise a determination that mobile device 102 may be moving or may have been moved in a particular manner and/or via a particular mode of transportation. In certain example implementations, a determination at block 304 may comprise a determination that one or more particular other devices may or may not be within a threshold distance of mobile device 102. In certain example implementations, a determination at block 304 may be based, at least in part, on a current or future time period. In certain example implementations, a determination at block 304 may be based, at least in part, on one or more patterns or models of behavior 228.

At example block 306, one or more patterns or models of behavior 228 may be accessed or otherwise obtained, maintained, or established for one or more states 222. For example, a pattern or model of behavior 228 may be based, at least in part, on one or more sensed indicators. Here, for example, sensed indicators may relate to certain POIs 140, one or more perceived user activities, a perceived mode of transportation and/or other movements of mobile device 102, an estimated location position, destination and/or path to travel, certain perceived environmental changes, an electronic map or other like encoded data files, a work schedule, a travel schedule, an on-line calendar, an electronic appointment book, a communication log, status information regarding other devices that may be nearby, and/or the like or some combination thereof. For example, a pattern or model of behavior 228 may be based, at least in part, on one or more encoded data files 238, and/or location position and/or other like information from a location receiver 124.

At example block 308, the dynamic user profile may be transitioned as applicable, e.g., from the first state to the second state. For example, in certain example implementations, a state 222 (encoded data, semantic terminology, bit pattern, etc.) stored in memory may indicate a current inferable user behavior context of the second state.

At example block 310, one or more functions 118 may be operatively affected in some manner based, at least in part, on the transition of the dynamic user profile from the first state to the second state. For example, an operation of a function may be altered in response to a transition to the second state. For example, an operation of a function may be initiated, paused, or halted, in response to a transition to the second state.

As illustrated in the various examples herein, in certain implementations, in addition to determining that a mobile device may be proximate or geographically close to a POI (e.g., by applying a geofence, threshold, etc.), a particular "user behavior context" may be inferred to associate the user with the POI. For example, a POI that is a restaurant may serve multiple different functions such as 1) a place for purchasing a meal and dining, 2) place of employment (e.g., for employees of the restaurant), 3) a delivery destination (e.g., for a vendor) or 4) a regulated establishment (e.g., for a government health inspector of alcoholic beverage commission). Likewise, a user approaching a restaurant may have particular attributes such as any one of several roles including a regular patron, health inspector, waiter, vendor, etc. Thus, by associating an individual's particular role with a function of the restaurant, a particular current user behavior context may be inferred as the user travels towards, nearby, etc., the restaurant. In this particular example, a current inferable user behavior context 226 may be indicative of a user's purpose for the visit. Hence, with a current inferable user behavior context 226 in mind, a location-based service function and/or the like may more appropriately tailor a specific course of action to be taken in response to such a user with regard to a POI.

In another particular example, a school building may serve multiple different functions such as 1) a place to receive an education, 2) place of employment, or 3) home. Likewise, a user approaching the school building may have particular attributes such as any one of several roles such as, for example, a student, teacher, a vendor, a visitor, or a custodian. Again, by associating a user's particular role with a function of the school building, a particular user behavior context may be inferred with regard to the school building, the user's activities, and/or a period of time.

In addition to an association of particular user's attributes with one of multiple different functions of a POI, information such as time of day, day of week, weather, signals, or other data derived from various inertial and/or environmental sensors on mobile device 102 may be used to further infer a particular context in connection with a user being proximate to or approaching a POI.

In certain example implementations, a current inferable user behavior context 226 may be inferred, at least in part, from signals received from sensors on a mobile device and a particular semantic context of the POI. Responsive to an inference of a user's present context, action may be taken by a mobile device such as, for example, automatically sending an SMS text message, and/or sounding an alarm, just to name a few examples. For example, signals generated by inertial sensors or environmental sensors may be associated with one or more known or previously observed patterns of behavior. Such a pattern of behavior may be indicative of being leisurely, in a rush, walking/running, or behavior indicative of a state of panic, just to name a few examples. A semantic context of a POI may be defined, at least in part, by a particular function associated with the POI as discussed above.

In example implementations, various types of information such as network parameters (e.g., signal strength, number and IDs of network access points or base stations, channel frequencies, etc.), sensor data (e.g. accelerometer, orientation, . . . ), user data (e.g. interaction with device, response time), and derived data (e.g. average, standard deviation, delta of available data) may be associated with a semantic meaning of a proximate POI such as home, work, daycare, theater, etc. to help identification and classification of places and their semantic meaning Information about wireless networks, sensor data, and user interaction may be available on mobile devices—the semantic name of a place may be provided by user annotation or from certain applications. By capturing the mapping of such annotation to a derived place model (e.g. network information, sensor data, user interaction), users' subsequent visits to that place may be more easily and/or more accurately identified. Further, semantic meaning of places may be shared among users. Identification and classification of places and their semantic meaning of the user may help to better understand the user's context, activities, and intend. Such information may also be built into the data model (e.g. user model, location model) for reasoning purposes. A structured representation of this information as part of the contextual data model may allow for reasoning about the user's context by also include the places and their semantic meaning.

In another example, responsive to an absence of a match from an attempt to match sensed indicators with a known or previously observed patterns or models of behavior, new patterns or models of behavior may be derived and stored for use in determining a state of a dynamic user profile at some point in the future.

In another example implementation, instead of or in addition to behavior patterns inferred from sensor signals, a condition or state of an application hosted on the mobile device may be associated with a semantic context of a POI for inferring a present context of a user. Such a condition or state of an application may include, for example, being in a voice call, having an email application opened, preparing a text message, and/or playing music, just to name a few examples. Furthermore, a semantic context of a POI may be derived, at least in part, by a history of user behavior as learned from signals received over time from sensors on a mobile device. In one example implementation, a mobile device may take a first action in response to an inferred present context of an individual. A semantic context of a POI may then be updated based, at least in part, on the individual's behavior around or in connection with the POI. A subsequent context of the individual relative to the POI may then be inferred based, at least in part, on the updated context. In response to the subsequent context, the mobile station may take a second action different from the first action.

As presented herein, since a user's behavior context may change from time to time, such a current behavior context (e.g., a current role, etc.) may be inferred based, at least in part, on one or more sensed indicators. Accordingly, in response to a determined change in the user's behavior context one or more functions performed or otherwise provided via a mobile device may be affected to operate in some particular manner. One of the examples previously mentioned was that a user's current behavior context may change depending on whether or not there is be a child with them, e.g., with the user in a role of a parent or guardian of the child.

More specifically, in certain example implementations, a dynamic user profile that may be indicative of a current inferable user behavior context for a user co-located with the mobile device may be determined by a mobile device. Since a user's behavior context may change from time to time as may be inferred, based at least in part, on one more sensed indicators, a dynamic user profile may, at times, transition from one state to another state. Thus, for example a dynamic user profile may transition from a first state to a second state based, at least in part, on one or more sensed indicators. In the example parent/guardian and child example above, a first state may be "without child present" and a second state may be "with child present", or some other indications.

In certain example instances, a current inferable user behavior context may be based, at least in part, on sensed indicators relating to a POI. In certain example instances, a current inferable user behavior context may be based, at least in part, on sensed indicators relating to a user activity. In certain example instances, a current inferable user behavior context may be based, at least in part, on sensed indicators relating to a period of time. Thus, for example, in the parent/guardian and child example above: a user may be inferred to be in a particular role with regard to a determined POI, e.g., "with a child" while at nearby a school, or "without a child" while at a cigar shop; a user may be inferred to be in a particular role with regard to some determined user activity, e.g., a "with a child" while driving a school bus, or "without a child" while on a workday lunch break; and/or a user may be inferred to be in a particular role with regard to a particular time, e.g., "with a child" during a scheduled doctor appointment for the child, or "without a child" while working a factory shift. In certain example instances, in a parent/guardian and child example above a user may be inferred to be in a particular role with regard to a determined POI, while involved in some determined user activity, and within a particular time.

Also, as illustrated herein, various sensed indicators may be considered in determining a dynamic user profile that may be indicative of a current inferable user behavior context. For example, in certain instances, wireless signals may be sensed using a receiver, one or more inertial and/or environmental sensors may be used, sound and/or light may be sensed, and/or an estimated position location, an estimated destination, and/or an estimated route may be determined via sensed signals. In certain further examples, a schedule file (e.g., the user's calendar) and/or a communication file (e.g., a call log) may be processed to identify a sensed indicator. Here, for example, in the parent/guardian and child example above, a sensed indicator may relate to a scheduled school pick-up/drop-off event that may be used to infer a role of "with a child" or "without a child," which may be useful in determining a user behavior context beyond or in addition to other sensor-based sensed indicators.

As illustrated herein, a mobile device may determine whether a dynamic user profile is to transition from a first state to a second state based, at least in part, on one or more sensed indicators. Thus, a role of a user may be inferred to change at times based on sensed indicators and as such it may be beneficial for a mobile device to operate differently in response to a determined transition. For example, a mobile device may detect that a user who is a coffee drinker may have already had her coffee, e.g., based on sensed signals from her coffee maker at home, a sensed stop at some coffee shop POI, or a sensed indicator that she may be late for an appointment, etc. Accordingly, if a dynamic user profile indicates that the user is a role of a "recent coffee drinker" then a coupon for a coffee shop may not be presented via the mobile device, but which might have been presented if a dynamic user profile indicates that the user is a role of a "thirsty coffee drinker".

In another example, a dynamic transition may be determined when a user may likely be late for some scheduled event and appears there is some sensed indications that the user may be "rushing" in their activities, etc., in response to being late. In certain instances, for example, a mobile device may operatively affect a coupon delivery function (service) to not deliver a coupon for a coffee shop when a "thirsty coffee drinker" is also inferred to "be in a rush". Hence, for example, in certain instances, a plurality of dynamic user profiles may be considered, and/or a dynamic user profile may be indicative of a plurality states relating to various inferable user behavior contexts.

In yet another example such as a parent/guardian and child example, a transition may dynamically occur when a user's mobile device senses a nearby child's mobile device or like tracking device (e.g., via Bluetooth, etc.), or perhaps further based on a sensed car motion (e.g., via an accelerometer), a sensed calendar event (e.g., a child's doctor appointment), or perhaps a known school drop-off event (e.g., from a calendar, a learned pattern (day of week, time, etc.)), or a combination thereof, or the like.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," or "in certain implementations," or other like phrases in various places throughout this specification, are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "establishing," "obtaining," "identifying," "maintaining," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and," "or," and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   determining whether a dynamic user profile is to transition from a first state to a second state based, at least in part, on one or more sensed indicators, wherein said second state comprises a previously unknown state, and said dynamic user profile being indicative of a current inferable user behavior context for a user co-located with said mobile device;
   transitioning said dynamic user profile from said first state to said second state in response to a determination that said dynamic user profile is to transition from said first state to said second state; and
   operatively affecting one or more functions performed, at least in part, by said mobile device based, at least in part, on said transition of said dynamic user profile from said first state to said second state.

2. The method as recited in claim 1, wherein determining whether said dynamic user profile is to transition from said first state to said second state further comprises:
   determining whether said one or more sensed indicators matches one or more stored patterns or models of behavior previously associated with at least said first state; and
   in response to a determination that said one or more sensed indicators does not match said one or more stored patterns or models of behavior previously associated with at least said first state, determining that said dynamic user profile is to transition from said first state to said second state.

3. The method as recited in claim 2, further comprising:
   establishing and storing one or more new patterns or models of behavior associated with said previously unknown state based, at least in part, on said one or more sensed indicators.

4. The method as recited in claim 3, wherein establishing said one or more new patterns or models of behavior associated with said previously unknown state further comprises:
   identifying said current inferable user behavior context for said user with regard to said second state.

5. The method as recited in claim 1, wherein said current inferable user behavior context is based, at least in part, on one or more points of interest.

6. The method as recited in claim 1, wherein said current inferable user behavior context is based, at least in part, on one or more user activities.

7. The method as recited in claim 1, wherein said current inferable user behavior context is based, at least in part, on one or more time periods.

8. The method as recited in claim 1, wherein at least one of said one or more sensed indicators is based, at least in part, on one or more wireless signals received from one or more other devices via one or more network interfaces of said mobile device.

9. The method as recited in claim 1, wherein at least one of said one or more sensed indicators is based, at least in part, on either or both of: one or more sensed inertial movements of said mobile device from one or more inertial sensors of said mobile device, or one or more sensed environmental measurements from one or more environmental sensors.

10. The method as recited in claim 1, wherein at least one of said one or more sensed indicators is based, at least in part, on either or both of: one or more encoded audio signals recorded using a microphone of said mobile device, or one or more encoded images recorded using a light sensitive environmental sensor of said mobile device.

11. The method as recited in claim 1, wherein at least one of said one or more sensed indicators is based, at least in part, on a current estimated position location of said mobile device.

12. The method as recited in claim 1, wherein at least one of said one or more sensed indicators is based, at least in part, on either or both of: an estimated future destination of said mobile device, or an estimated route of travel of said mobile device.

13. The method as recited in claim 1, wherein at least one of said one or more sensed indicators is based, at least in part, on either or both of: one or more user schedule files accessible via said mobile device, or one or more user communication files accessible via said mobile device.

14. The method as recited in claim 1, wherein said one or more functions performed, at least in part, by said mobile device comprises at least one of: one or more location based service functions, one or more position location functions, one or more navigation functions, one or more network communication functions, or one or more user output functions.

15. An apparatus for use in a mobile device, the apparatus comprising:
   means for determining whether a dynamic user profile is to transition from a first state to a second state based, at least in part, on one or more sensed indicators, wherein said second state comprises a previously unknown state, and said dynamic user profile being indicative of a current inferable user behavior context for a user co-located with said mobile device;
   means for transitioning said dynamic user profile from said first state to said second state, in response to a determination that said dynamic user profile is to transition from said first state to said second state; and
   means for operatively affecting one or more functions performed, at least in part, by said mobile device based, at least in part, on said transition of said dynamic user profile from said first state to said second state.

16. The apparatus as recited in claim 15, further comprising:
   means for storing one or more patterns or models of behavior previously associated with at least said first state;
   means for determining whether said one or more sensed indicators matches said one or more stored patterns or models of behavior previously associated with at least said first state; and
   means for determining that said dynamic user profile is to transition from said first state to said second state, in response to a determination that said one or more sensed indicators does not match said one or more stored patterns or models of behavior previously associated with at least said first state.

17. The apparatus as recited in claim 16, further comprising:
   means for establishing one or more new patterns or models of behavior associated with said previously unknown state based, at least in part, on said one or more sensed indicators.

18. The apparatus as recited in claim 17, further comprising:
   means for identifying said current inferable user behavior context for said user with regard to said second state.

19. The apparatus as recited in claim 15, wherein said current inferable user behavior context is based, at least in part, on one or more points of interest.

20. The apparatus as recited in claim 15, wherein said current inferable user behavior context is based, at least in part, on one or more user activities.

21. The apparatus as recited in claim 15, wherein said current inferable user behavior context is based, at least in part, on one or more time periods.

22. The apparatus as recited in claim 15, further comprising:
   means for receiving one or more wireless signals from one or more other devices; and
   wherein at least one of said one or more sensed indicators is based, at least in part, on at least one received wireless signal.

23. The apparatus as recited in claim 15, further comprising:
   means for sensing one or more inertial movements of said mobile device; and
   wherein at least one of said one or more sensed indicators is based, at least in part, on at least one sensed inertial movement of said mobile device.

24. The apparatus as recited in claim 15, further comprising:
   means for obtaining one or more environmental measurements; and
   wherein at least one of said one or more sensed indicators is based, at least in part, on at least one obtained environmental measurement.

25. The apparatus as recited in claim 15, further comprising:
   means for obtaining a current estimated position location of said mobile device; and
   wherein at least one of said one or more sensed indicators is based, at least in part, on said current estimated position location.

26. The apparatus as recited in claim 15, further comprising:
   means for accessing either or both of: one or more user schedule files, or one or more user communication files; and
   wherein at least one of said one or more sensed indicators is based, at least in part, on either or both of: at least one of said user schedule files, or at least one of said user communication files.

27. The apparatus as recited in claim 15, wherein said one or more functions performed, at least in part, by said mobile device comprises at least one of: one or more location based service functions, one or more position location functions; one or more navigation functions, one or more network communication functions, or one or more user output functions.

28. A mobile device comprising:
   memory; and
   a processing unit to:
   determine whether a dynamic user profile is to transition from a first state to a second state based, at least in part, on one or more sensed indicators in said memory, wherein said second state comprises a previously unknown state, and said dynamic user profile being indicative of a current inferable user behavior context for a user co-located with said mobile device;
   transition said dynamic user profile from said first state to said second state, in response to a determination that said dynamic user profile is to transition from said first state to said second state; and
   operatively affect one or more functions performed, at least in part, by said mobile device based, at least in part, on said transition of said dynamic user profile from said first state to said second state.

29. The mobile device as recited in claim 28, said processing unit to further:
   determine whether said one or more sensed indicators matches one or more patterns or models of behavior stored in said memory and previously associated with at least said first state; and
   in response to a determination that said one or more sensed indicators does not match said one or more stored patterns or models of behavior previously associated with at least said first state, determine that said dynamic user profile is to transition from said first state to said second state.

30. The mobile device as recited in claim 29, wherein said processing unit to further:
establish one or more new patterns or models of behavior associated with said previously unknown state based, at least in part, on said one or more sensed indicators; and
indicate said one or more new patterns or models of behavior associated with said previously unknown state to said memory for storage therein.

31. The mobile device as recited in claim 30, said processing unit to further:
identify said current inferable user behavior context for said user with regard to said second state.

32. The mobile device as recited in claim 28, wherein said current inferable user behavior context is based, at least in part, on one or more points of interest.

33. The mobile device as recited in claim 28, wherein said current inferable user behavior context is based, at least in part, on one or more user activities.

34. The mobile device as recited in claim 28, wherein said current inferable user behavior context is based, at least in part, on one or more time periods.

35. The mobile device as recited in claim 28, further comprising:
a network interface; and
wherein at least one of said one or more sensed indicators is based, at least in part, on one or more wireless signals received from one or more other devices via said network interface.

36. The mobile device as recited in claim 28, further comprising:
one or more inertial sensors; and
wherein at least one of said one or more sensed indicators is based, at least in part, on one or more sensed inertial movements of said mobile device from said one or more inertial sensors.

37. The mobile device as recited in claim 28, further comprising:
one or more environmental sensors; and
wherein at least one of said one or more sensed indicators is based, at least in part, on one or more sensed environmental measurements from said one or more environmental sensors.

38. The mobile device as recited in claim 28, further comprising:
a location receiver to estimate a current estimated position location of said mobile device; and
wherein at least one of said one or more sensed indicators is based, at least in part, on said current estimated position location of said mobile device.

39. The mobile device as recited in claim 28, said processing unit to further:
determine either or both of an estimated future destination of said mobile device or an estimated route of travel of said mobile device; and
wherein at least one of said one or more sensed indicators is based, at least in part, on either or both of: said estimated future destination of said mobile device, or said estimated route of travel of said mobile device.

40. The mobile device as recited in claim 28, wherein at least one of said one or more sensed indicators is based, at least in part, on either or both of: one or more user schedule files accessible via said memory, or one or more user communication files accessible via said memory.

41. The mobile device as recited in claim 28, wherein said one or more functions performed, at least in part, by said mobile device comprises at least one of: one or more location based service functions, one or more position location functions, one or more navigation functions, one or more network communication functions, or one or more user output functions.

42. An article comprising:
a non-transitory computer-readable medium having stored therein computer-readable instructions executable by one or more processing units in a mobile device to:
determine whether a dynamic user profile is to transition from a first state to a second state based, at least in part, on one or more sensed indicators, wherein said second state comprises a previously unknown state, and said dynamic user profile being indicative of a current inferable user behavior context for a user co-located with said mobile device;
transition said dynamic user profile from said first state to said second state, in response to a determination that said dynamic user profile is to transition from said first state to said second state; and
operatively affect one or more functions performed, at least in part, by said mobile device based, at least in part, on said transition of said dynamic user profile from said first state to said second state.

43. The article as recited in claim 42, said computer-readable instructions being further executable by said one or more processing units to:
determine whether said one or more sensed indicators matches one or more stored patterns or models of behavior previously associated with at least said first state; and
determine that said dynamic user profile is to transition from said first state to said second state, in response to a determination that said one or more sensed indicators does not match said one or more stored patterns or models of behavior previously associated with at least said first state.

44. The article as recited in claim 43, wherein
said computer-readable instructions being further executable by said one or more processing units to establish one or more new patterns or models of behavior associated with said previously unknown state based, at least in part, on said one or more sensed indicators.

45. The article as recited in claim 44, said computer-readable instructions being further executable by said one or more processing units to identify said current inferable user behavior context for said user with regard to said second state.

46. The article as recited in claim 42, wherein said current inferable user behavior context is based, at least in part, on one or more points of interest.

47. The article as recited in claim 42, wherein said current inferable user behavior context is based, at least in part, on one or more user activities.

48. The article as recited in claim 42, wherein said current inferable user behavior context is based, at least in part, on one or more time periods.

49. The article as recited in claim 42, wherein at least one of said one or more sensed indicators is based, at least in part, on at least one received wireless signal.

50. The article as recited in claim 42, wherein at least one of said one or more sensed indicators is based, at least in part, on at least one sensed inertial movement of said mobile device.

51. The article as recited in claim 42, wherein at least one of said one or more sensed indicators is based, at least in part, on at least one sensed environmental measurement.

52. The article as recited in claim 42, wherein at least one of said one or more sensed indicators is based, at least in part, on a current estimated position location.

53. The article as recited in claim 42, wherein at least one of said one or more sensed indicators is based, at least in part, on one or both of: one or more user schedule files, or one or more user communication files.

54. The article as recited in claim 42, wherein said one or more functions performed, at least in part, by said mobile device comprises at least one of: one or more location based service functions, one or more position location functions, one or more navigation functions, one or more network communication functions, or one or more user output functions.

\* \* \* \* \*